United States Patent [19]

Weston et al.

[11] 4,325,927

[45] Apr. 20, 1982

[54] PURIFIED MONOAMMONIUM PHOSPHATE PROCESS

[75] Inventors: Charles W. Weston, Prairieville; John W. Wen, Baton Rouge, both of La.

[73] Assignee: Agrico Chemical Company, Tulsa, Okla.

[21] Appl. No.: 214,991

[22] Filed: Dec. 10, 1980

Related U.S. Application Data

[63] Continuation-in-part of Ser. No. 103,459, Dec. 14, 1979, abandoned.

[51] Int. Cl.$^3$ ............................................. C01B 25/28
[52] U.S. Cl. .................................... 423/310; 423/313
[58] Field of Search ............................... 423/310, 313

[56] References Cited

U.S. PATENT DOCUMENTS

| | | | |
|---|---|---|---|
| 2,792,286 | 5/1957 | Wordie et al. | 423/313 |
| 2,799,569 | 7/1957 | Wordie et al. | 423/313 |
| 2,891,856 | 6/1959 | Getsinger et al. | 71/41 |
| 3,201,195 | 8/1965 | Huber et al. | 423/310 |
| 3,323,863 | 6/1967 | Seymour | 423/310 |
| 3,667,904 | 6/1972 | Roche et al. | 423/310 |
| 3,974,263 | 8/1976 | Crerar et al. | 423/313 |

OTHER PUBLICATIONS

Ando et al, "Ammoniation Reactions of Wet-Process Phosphoric Acid," Chuo University, Japan.
Potts et al, "Liquid Fertilizers from Wet-Process Phosphoric Acid," Chemical Engineering Progress, (vol. 58, No. 9), (Sep. 1962), pp. 89-93.
Claim 1 of U.S. Pat. No. 4,117,089.

*Primary Examiner*—Edward J. Meros
*Assistant Examiner*—Wayne A. Langel
*Attorney, Agent, or Firm*—Richards, Harris & Medlock

[57] ABSTRACT

A method of producing purified monoammonium phosphate from wet process phosphoric acid and ammonia is provided. The ammoniation takes place in two stages, the acid being ammoniated in the first stage to a pH between about 1.5 and 2.5. This mixture is allowed to age after which the mixture is ammoniated to a pH between about 4 and 5. An impurity-containing precipitate is formed in the first and second stages of ammoniation that is easily filterable from the monoammonium phosphate solution derived from the second ammoniation stage.

25 Claims, No Drawings

PURIFIED MONOAMMONIUM PHOSPHATE PROCESS

This is a continuation-in-part of application Ser. No. 103,459, filed Dec. 14, 1979, abandoned.

TECHNICAL FIELD

The present invention pertains to a method of producing purified monoammonium phosphate from wet process phosphoric acid and ammonia.

BACKGROUND ART

Technical grade monoammonium phosphate is primarily produced by the reaction of furnace grade phosphoric acid with ammonia. However, furnace grade acid is very expensive and is expected to continually increase in price. Therefore, a need exists to provide a purified monoammonium phosphate which can be prepared from less expensive starting materials, but which will nevertheless be usable in applications heretofore requiring "technical grade" monoammonium phosphate.

In the past, attempts to prepare relatively pure monoammonium phosphate from less pure "wet process" acid have not been economically attractive because impurities that are present in wet process grade phosphoric acid, upon ammoniation of the acid, precipitate in a form which is very difficult to remove. It is necessary to remove these impurities from the ammoniated phosphoric acid so that a relatively pure monoammonium phosphate product can be produced.

Therefore, an unsatisfied need exists for the production of monoammonium phosphate from wet process grades of phosphoric acid, which method would also allow for efficient and simple removal of the associated impurities by the use of conventional equipment and techniques. Further, a need has arisen for a process for the production of ammonium phosphate from wet process phosphoric acid and ammonia that provides for efficient removal of precipitated impurities from the ammoniated phosphoric acid solution and produces a relatively pure monoammonium phosphate.

DISCLOSURE OF THE INVENTION

A method of producing purified monoammonium phosphate from wet process phosphoric acid and ammonia is provided comprising a first stage ammoniation of a wet process phosphoric acid feed to a pH between about 1.5 and 2.5. The first stage ammoniation is carried out at a temperature between about 75° C. and 105° C. and converts a portion of the phosphoric acid into monoammonium phosphate while also causing an impurity-containing precipitate to form.

After the first stage ammoniation, the resulting mixture is generally allowed to age for about 10 minutes or more to cause maximum precipitation of the impurities at these conditions. The ammoniated solution from the first stage is then further ammoniated to a pH of between about 4 and 5. The second stage ammoniation produces filterable agglomerates of impurity-containing precipitates suspended in a solution of monoammonium phosphate. The impurity-containing precipitates are removed from the monoammonium phosphate solution. Monoammonium phosphate is recovered from the resulting solution by crystallization. Crystallization of the monoammonium phosphate can be effected by cooling or evaporation, for example. The monoammonium phosphate crystals can then be removed by any suitable method, such as centrifugation or filtration.

The liquor recovered in the crystallization step can be reconcentrated for further monoammonium phosphate recovery or the liquor can be recycled to the first stage of ammoniation.

The method according to the present invention can be conducted either in a continuous, semi-continuous or batch process although for most commercial operations, the continuous or semi-continuous methods will be preferred. In a semi-continuous process, the first stage ammoniation is conducted in a continuous manner and the second stage ammoniation is conducted in a batchwise manner.

An important aspect of the process according to the invention is that the impurity-containing precipitates formed in the first and second stages of ammoniation are easily filterable from the monoammonium phosphate solution derived from the second ammoniation stage.

DETAILED DESCRIPTION OF THE INVENTION

A process is provided for producing purified monoammonium phosphate from wet process grade phosphoric acid and ammonia. The process may either be batchwise, semi-continuous or continuous. The product produced in accordance with the invention is greater than 98% monoammonium phosphate.

All pH values and measurements in this specification are made by diluting the sample with 10 parts of water for one part of sample. This allows a more accurate and reliable pH determination to be made. Thus, the pH values referred to herein are somewhat higher than the actual pH of the undiluted sample, often by as much as 0.5 units.

According to one embodiment of the present invention, a phosphoric acid feed having a concentration of from about 25% to about 35% $P_2O_5$ by weight is ammoniated in a first ammoniation stage to a pH of from about 1.5 to about 2.5. With acids used by the inventors, Florida rock acids, the preferred pH is about 2.3 in the first ammoniation stage. For a given acid, the preferred pH is the minimum pH at which a precipitate will form within a reasonable time. "Reasonable time" as used herein means about 30 minutes. The first stage ammoniation generally precipitates at least about 20% of the metallic impurities present in the phosphoric acid feed. Generally, the minimum amount of time required for the first stage ammoniation is about 10 minutes, and preferably the first stage ammoniation is carried out for about 30 minutes to about 45 minutes. For example, if a continuous stirred tank reactor is used, a residence time of from about 30 to about 45 minutes is preferred. Preferably, the phosphoric acid feed has a concentration of from about 25% to about 28% by weight $P_2O_5$. The feed acid is preferably obtained by diluting a concentrated (48-54% $P_2O_5$) wet process acid in order to assure a low fluorine content in the feed acid, as hereinafter discussed.

The temperature during the first stage ammoniation should be between about 75° C. and 105° C. Preferably, the temperature during the first stage ammoniation is between about 85° C. and 95° C. The reaction between the phosphoric acid and ammonia that forms monoammonium phosphate is exothermic and the reaction mixture can generally attain a temperature of 85° C. to 95° C. without the addition of heat. During the ammoniation of the phosphoric acid solution, the solution should be agitated to insure uniform reaction of ammonia with phosphoric acid.

Generally, after the phosphoric acid feed has been ammoniated to a pH of from about 1.5 to about 2.5, the mixture is allowed to age for about 10 minutes and preferably about 30 minutes to cause maximum precipitation of the impurities present in the phosphoric acid feed at the pH attained by the first stage ammoniation. Optionally, a small amount of solids removed from the slurry after the second stage ammoniation can be introduced into the first stage ammoniation to facilitate and accelerate the formation of the precipitate.

Generally, the phosphoric acid feed that is ammoniated in the first ammoniation stage should contain no more than about 2.0% by weight fluorine and no more than about 1.0% $SiO_2$ by weight. In addition, the atomic ratio of fluorine to the combined amount of iron and aluminum on a molar basis should be less than 2.0. Typical impurities present in commercial grades of phosphoric acid include iron, aluminum, fluorine and silicon. Preferably, fluorine is present in a range of from about 0.5% to about 1.5% by weight of the phosphoric acid and $SiO_2$ is present in an amount of from about 0.1% to about 0.75% by weight. The preferred atomic ratio of fluorine to the combined amount of iron and aluminum on a molar basis is from about 1.25 to about 1.35. Preferably, the phosphoric acid feed contains a minimum of 0.5% by weight $Fe_2O_3$ and 0.5% by weight $Al_2O_3$, with $Fe_2O_3$ and $Al_2O_3$ being present in a ratio of at least 1:1 for optimum formation of precipitates that are easily removable, for example, by filtration.

The absolute and relative amounts of impurities together with the reaction conditions cause the impurities present in the phosphoric acid to form a precipitate upon the first stage ammoniation. This precipitate is a crystalline material. Further ammoniation, in a second stage, of the first stage ammoniation solution to a pH of from about 4.0 to about 5.0 causes further precipitation of impurities. The second stage ammoniation will generally require about 30 minutes. In this manner, the great bulk of the impurities present in the feed forms a precipitate that can be easily removed by filtration or other solids-liquids separation techniques.

While the exact mechanism by which the precipitation of impurities in the phosphoric acid takes place is not completely known, it is theorized that the solids formed during the first ammoniation stage are principally of an $(Al,Fe)NH_4(HPO_4)_2 \cdot \frac{1}{2}H_2O$ complex. The formation of this complex has been verified by X-ray defraction studies and elemental analysis. This complex is principally a crystalline substance and forms in significant amounts at a pH between about 1.5 and 2.5 and continues to precipitate as the pH is increased to about 4 or 5. The $(Al,Fe)NH_4(HPO_4)_2 \cdot \frac{1}{2}H_2O$ complex is a fluoride-free compound which forms in substantial amounts at a pH of from about 1.5 to about 2.5 where the atomic ratio of fluorine to the combined amount of iron and aluminum on a molar basis is less than 2.0. However, the exact chemical nature of the precipitated impurity is not of great importance. It is the physical condition and nature of the solid impurity that is important since the physical condition and nature of the impurity determines whether it can be readily removed from the solution using conventional filtration equipment. It is theorized that by terminating ammoniation just before or just at point of visible solid precipitation, usually in the pH range of between about 1.5 and 2.5, crystalline nuclei are formed and are not the gelatinous type of precipitate normally formed upon further ammoniation. At this point, the solubility of the impurity containing precipitates is still relatively high, and the supersaturation is correspondingly low. After allowing the crystal nuclei to grow for a short aging period the conditions which are ideal for the formation of larger crystals, the ammoniation can be completed rather rapidly without the hazard of subsequent overnucleation or gel formation. Thus, the process in accordance with the present invention insures the initial presence of good crystal nuclei without necessitating the use of dilution or high temperature to guaranty a filterable precipitate.

Preferably, for both ammoniation stages, ammonia is added at a relatively slow rate, as indicated by the residence times or ammoniation times set forth for each ammoniation stage. The relatively slow rate of ammoniation helps prevent the unwanted formation of gelatinous precipitates which are unfilterable and insures uniform reaction of ammonia and phosphoric acid.

During the second ammoniation stage, in which the first stage ammoniated mixture is further ammoniated to a pH of between about 4.0 and 5.0, the final impurity precipitate contained in the product slurry after the second ammoniation stage contains fluorine. The filtration rate for the product slurry after the second ammoniation stage using vacuum filtration in laboratory tests is generally from about 35 gal/ft$^2$/hr to about 95 gal/ft$^2$/hr. Pilot plant tests of the process in accordance with the invention have resulted in average filtration rates of about 185 gal/ft.$^2$/hr., utilizing a belt filter.

After the second ammoniation stage has been completed, which normally requires about 30 minutes, the precipitates should be removed with minimum aging to yield a monoammonium phosphate solution. The monoammonium phosphate is separated from the resulting purified solution to yield the final product monoammonium phosphate.

While any suitable method can be used to separate the monoammonium phosphate from solution, a preferred method includes crystallization of the monoammonium phosphate resulting in a solid which can be easily separated from the solution by, for example, filtration or centrifugation. Separation of the solid monoammonium phosphate from the purified product slurry results in a mother liquor which essentially is dilute ammonium phosphate solution.

Crystallization of the monoammonium phosphate may be accomplished by cooling the purified product slurry, by concentrating (i.e., eliminating water) from the purified product slurry or by combinations of the foregoing methods. If the mother liquor from the crystallization step is not recycled to the first ammoniation stage, dissolved organics should be removed from the liquor before further crystallization. Such removal may be affected, for example, by carbon sorption.

If substantially all the monoammonium phosphate is not recovered by total evaporation, it is advantageous to combine the mother liquor from the crystallization stage with a wet process phosphoric acid to produce the feed for the first ammoniation stage. The required parameters for the resulting feed have already been described. Generally, one type of wet process phosphoric acid that is suitable for use in accordance with the invention is "merchant" grade phosphoric acid. Merchant grade phosphoric acid is wet process phosphoric acid that has been concentrated (i.e., water removed) such that the acid has a $P_2O_5$ concentration of from about 48% by weight to about 56% by weight.

Preferably, the acid fed to the first stage for ammoniation contains between about 0.5 to 1.5% fluorine. The process can be operated with a fluorine concentration up to about 2.0% fluorine, but the higher the fluorine concentration, the more difficult will be removal of precipitated impurities. The feed, while preferably derived from diluted merchant grade acid, can be obtained by blending wet process filter acid with diluted merchant grade acid.

Generally, the mother liquor from the final stage cannot be recycled without significant fluorine build-up in the process unless the fluorine in the wet process phosphoric acid that comprises the feed acid is present in a concentration of less than about 1.0% by weight. Process wash water from washing the precipitates can also be added to the mother liquor or added to the first stage ammoniation to be combined with a wet process phosphoric acid feed. While filter grade phosphoric acid (about 28% to about 32% $P_2O_5$) can be used in the process of the present invention, generally the amounts of impurities in filter acid are such that the atomic ratio of fluorine to aluminum and iron on a molar basis is from about 3.5 to about 4.0 with fluorine being present in a concentration of from about 2.0% to about 3.0% by weight. These amounts of impurities are not within the preferred ranges and will reduce the filtration rate of the solids. In addition, if the mother liquor is recycled, the fluorine concentration would increase, further reducing the filtration rate and eventually resulting in a gelatinous precipitate that is very difficult to remove.

During start-up of a continuous system process that recycles mother liquor to the first ammoniation stage in accordance with the present invention, there will be no mother liquor to recycle, and ammoniation of about 54% $P_2O_5$ phosphoric acid would result in premature formation of monoammonium phosphate in the slurry retarding filtration of the precipitated impurities. The 54% acid can be diluted with water to about 25% to about 35% $P_2O_5$ during start-up to avoid this problem.

After removing the precipitated impurities from the monoammonium phosphate, diammonium phosphate can be produced by ammoniating the monoammonium phosphate to a pH of about 8.

EXAMPLE 1

Monoammonium phosphate was produced in accordance with the method of the present inventon. Wet process phosphoric acid having a concentration of about 54% $P_2O_5$ produced from Florida phosphate rock was combined with a recycle made up of a combination of mother liquor and process wash water, which combination contained from 3% to 4% by weight nitrogen and from 13% to 18% by weight $P_2O_5$. The combination of wet process phosphoric acid and recycle mother liquor and process wash water, when combined to make the feed acid, had a specific gravity of from 1.26 to 1.28 and had a $P_2O_5$ concentration of from 25% to 28% by weight. Ammonia was slowly sparged into the reaction tank containing the feed acid while agitating to insure uniform reaction of ammonia and phosphoric acid. The heat of reaction maintained the temperature of the reactants in the reaction tank between 85° C. and 95° C. When a pH of from 2 to 2.5 was attained, the ammonia feed was terminated and a small amount of seed crystals were added to accelerate the formation of the precipitate. At the end of 30 minutes, from 20% to 30% of the total impurities present were in the form of precipitated impurities. The slurry was then ammoniated to a pH of 4.5. The product slurry at this stage had a specific gravity of from 1.26 to 1.30 at a temperature of 95° C.

The slurry was then vacuum filtered and the filtrate was cooled to a temperature of from 39° C. to 40° C. to cause monoammonium phosphate crystallization from solution. The filtration rate of the slurry was about 50 gal/ft²/hr. The yield of monoammonium phosphate based upon the total amount of $P_2O_5$ ultimately recoverable as purified monoammonium phosphate was about 72%.

The chemical analysis of this process is listed in Table 1.

TABLE I

| Wt. % | Feed Acid | Mother Liquor | Solids | MAP |
|---|---|---|---|---|
| $P_2O_5$ | 27.34 | 13.86 | 48.28 | 60.43 |
| N | 1.26 | 3.84 | 8.41 | 11.72 |
| CaO | 0.085 | 0.11 | 0.92 | 0.14 |
| MgO | 0.30 | 0.16 | 1.94 | 0.09 |
| $Al_2O_3$ | 0.50 | 0.01 | 4.02 | 0.11 |
| $Fe_2O_3$ | 0.97 | 0.01 | 8.62 | 0.14 |
| $Na_2O$ | 0.12 | 0.13 | 0.18 | 0.05 |
| F | 0.53 | 0.10 | 4.74 | 0.09 |
| $Fe_2O_3/Al_2O_3$ | 1.94 | | 2.15 | |

EXAMPLE 2

To demonstrate the effect that high levels of $F^-$ and $SiO_2$ in the feed acid could retard filtration in the process of the present invention, $H_2SiF_6$ and HF were added separately to feed acid prior to ammoniation. Acids containing $F^-$ in the form of $H_2SiF_6$ in excess of 2% produced a slimy and unfilterable solid when normal ammoniation procedures were followed in accordance with the invention. The filtration rate for this slurry was 5 gals/ft²/hr as compared to a normal filtration rate of 90 gal/ft²/hr.

Acid containing $F^-$ in the form of HF in excess of 2% also produced the slimy solid upon ammoniation in accordance with the invention, and the filtration rate of this slurry was also drastically reduced to 25 gal/ft²/hr.

EXAMPLE 3

Monoammonium phosphate was produced in accordance with the method of the present invention on a large scale pilot test. Wet process phosphoric acid having a concentration of about 54% $P_2O_5$ was utilized. Ammoniations were carried out batchwise in the 500 gal reactor. An ammoniated slurry was produced and filtered on an Emico Model 12 extractor which is a pilot scale belt-typed filter. The ammoniated slurry was produced in accordance with the invention by the procedure hereinafter described. First, the 54% $P_2O_5$ was diluted with water to a concentration of about 26% $P_2O_5$. Second, the 26% $P_2O_5$ phosphoric acid was ammoniated to pH of between about 2.3 to 2.5 over a period of between about 60 and 75 minutes. Third, the ammoniated phosphoric acid was aged to promote crystal growth for between about 10 and 15 minutes. Fourth, ammoniation was continued to a pH of 4.5 over a period of 45 minutes to 1 hour. Three runs were made in this manner as set forth in Table II.

TABLE II

| Filtration Test Number | Starting Acid | | Ammoniated Slurry Feed | | | | |
|---|---|---|---|---|---|---|---|
| | Sp.Gr. | % $P_2O_5$ | % N | % $P_2O_5$ | Sp.Gr. | Vol. (Gal.) | Wt. (lb.) |
| 1 | 1.274 | 26.0 | 5.18 | 25.2 | 1.274 | 414 | 4399 |
| 2 | 1.278 | 26.12 | 5.52 | 25.0 | 1.292 | 438 | 4720 |

TABLE II-continued

| 3 | 1.274 | 25.4 | 5.20 | 25.02 | 1.274 | 438 | 4654 |

| Total Filtration Time (Min.) | Filtration Rate (Gal. Slurry/ft$^2$/hr.) |
| --- | --- |
| 56 | 148.0 |
| 54 | 162.3 |
| 36 | 243.3 |

The average recovery of P$_2$O$_5$ as producted monoammonium phosphate based upon the starting acid and bi-product solids analysis for the three filtration test runs averaged 75.4%. The filtration rate was based upon the actual area of the filter that was utilized for filtration of the ammoniated slurry feed.

Although the invention has been described in preferred embodiments, it will be understood that the invention is not limited to the embodiments disclosed, but is capable of numerous rearrangements, modifications and substitutions without departing from the scope of the invention as set forth in the appended claims.

We claim:

1. A process for the production of purified monoammonium phosphate from wet process phosphoric acid comprising:
   (a) ammoniating to a pH between about 1.5 and 2.5 for a period of about 10 minutes or more wet process phosphoric acid having a concentration between about 25% and 35% by weight P$_2$O$_5$ and a fluorine content of less than about 2.0% by weight, said ammoniation taking place at a temperature between 75° C. and 105° C. to form a mixture containing a crystalline impurity precipitate;
   (b) allowing said mixture to age for a period of about 10 minutes or more after step (a) is completed;
   (c) further ammoniating said mixture from step (b) to a pH between about 4 and 5 to form a monoammonium phosphate solution and to precipitate additional impurities; and
   (d) removing said precipitated impurities from said monoammonium phosphate solution resulting in a purified solution of monoammonium phosphate.

2. The process as recited in claim 1 further comprising forming monoammonium phosphate crystals in said purified monoammonium phosphate solution obtained from step (d) in claim 1.

3. The process as recited in claim 2 further comprising removing said monoammonium phosphate crystals from said purified solution resulting in a mother liquor.

4. The process as recited in claim 3 wherein said monoammonium phosphate crystals are formed by cooling and/or evaporating said purified ammoniated solution.

5. The process as recited in claim 3 wherein said mother liquor is recycled to the first ammoniation stage.

6. The process as recited in claim 2 further comprising removal in crystalline form of substantially all of said monoammonium phosphate from said purified solution.

7. The process as recited in claim 1 wherein said phosphoric acid contains iron and aluminum in an atomic ratio of fluorine to iron and aluminum between about 1.0 and 2.0, and contains less than about 1.0% SiO$_2$ by weight.

8. The process as recited in claim 7 wherein said phosphoric acid contains fluorine, iron and aluminum in an atomic ratio of fluorine to iron and aluminum between about 1.25 and 1.35, and has a weight ratio of iron oxides to aluminum oxides of greater than about 1.0 and at least 0.5% by weight each of iron oxides and aluminum oxides and said acid contains between 0.1% and 0.75% by weight SiO$_2$.

9. The process as recited in claim 1 wherein the concentration of said phosphoric acid is initially from about 48% to about 56% P$_2$O$_5$ and is diluted with water prior to ammoniation to a concentration between about 25% and 28% P$_2$O$_5$.

10. The method as recited in claim 1, 9, 7 or 8 wherein said wet process phosphoric acid is derived from Florida phosphate rock and is ammoniated in said first stage to a pH of about 2.3.

11. The process as recited in claim 1 wherein said first stage ammoniation takes place for a period of between about 10 minutes and 45 minutes.

12. The method as recited in claim 1 wherein said first stage ammoniation takes place at a temperature of from about 85° C. to about 95° C.

13. In a process for the production of purified monoammonium phosphate from wet process phosphoric acid wherein the phosphoric acid is ammoniated to form monoammonium phosphate, the steps comprising ammoniating wet process phosphoric acid having a concentration of between about 25% and 35% by weight P$_2$O$_5$ to a pH between about 1.5 and 2.5 to form a crystalline precipitate, said ammoniation taking place at a temperature between about 75° C. and 105° C. for a period of about 10 minutes or more and thereafter aging the ammoniated phosphoric acid for about 10 minutes or more after the ammoniation to a pH between about 1.5 and 2.5 is completed and prior to further ammoniation to form said monoammonium phosphate.

14. The process as recited in claim 13 wherein said phosphoric acid prior to ammoniation contains fluorine, iron and aluminum impurities in an atomic ratio of fluorine to iron and aluminum between about 1.0 and 2.0 and said acid contains less than about 1.0% by weight SiO$_2$ and less than about 2.0% by weight fluorine.

15. The process as recited in claim 14 wherein said phosphoric acid contains fluorine in an atomic ratio of fluorine to iron and aluminum between about 1.25 and 1.35 and has a weight ratio of iron oxides to aluminum oxides of greater than about 1.0 and at least 0.5% by weight of each iron oxides and aluminum oxides and an SiO$_2$ concentration of between about 0.1% and 0.75% by weight.

16. The process as recited in claim 13 wherein said aging takes place for about 30 minutes.

17. The process as recited in claim 13 wherein the concentration of said phosphoric acid prior to ammoniation is from about 25% to about 28% by weight P$_2$O$_5$.

18. The process as recited in claim 13 wherein said ammoniation takes place at a temperature between about 85° C. and 95° C.

19. The process as recited in claim 13, 16, 17, 14, 15 or 6 further comprising:
   (a) further ammoniating the phosphoric acid to a pH between about 4 and 5 to form an ammonium phosphate solution and precipitate additional impurities;
   (b) thereafter removing the precipitates from said ammonium phosphate solution resulting in a purified solution of monoammonium phosphate; and
   (c) crystallizing at least part of the monoammonium phosphate present in said purified solution.

20. A method for the manufacture of purified monoammonium phosphate from wet process phosphoric acid comprising:
(a) ammoniating phosphoric acid to a pH between about 1.5 and 2.5 at a temperature between about 75° C. and 105° C., said phosphoric acid having a concentration of between about 25% and 35% by weight $P_2O_5$, a fluorine content of less than about 2.0% by weight, an atomic ratio of fluorine to iron and aluminum between about 1.0 and 2.0, and between about 0.1% and 0.75% by weight $SiO_2$, said ammoniation taking place over a period of about 10 minutes or more to produce a resulting mixture containing precipitated impurities;
(b) allowing said resulting mixture to age for about 10 minutes or more after completion of ammoniation in step (a);
(c) further ammoniating said resulting mixture from step (b) to a pH between about 4 and 5 at a temperature between about 75° C. and 105° C. over a period of between about 10 minutes and 30 minutes to precipitate additional impurities and form a monoammonium phosphate solution; and
(d) removing said precipitated impurities from the monoammonium phosphate solution obtained in step (c) to produce a purified monoammonium phosphate solution.

21. The method as recited in claim 20 further comprising forming and separating monoammonium phosphate crystals from said purified monoammonium phosphate solution leaving a mother liquor.

22. The method as recited in claim 21 wherein said monoammonium phosphate crystals are formed by cooling and/or evaporating said purified monoammonium phosphate solution.

23. The method as recited in claim 21 or 22 wherein said monoammonium phosphate crystals are removed by filtration or centrifugation.

24. The method as recited in claim 21 or 22 further comprising removing essentially all of the monoammonium phosphate present in the mother liquor by evaporation of water present in the mother liquor.

25. The method as recited in claim 21 wherein said mother liquor is combined with wet process phosphoric acid to provide phosphoric acid for ammoniation.

* * * * *